(12) United States Patent
Kettern-Kohler

(10) Patent No.: US 8,297,810 B2
(45) Date of Patent: Oct. 30, 2012

(54) HEADLAMP IN AN AUTOMOBILE

(75) Inventor: Horst Kettern-Kohler, Buchen (DE)

(73) Assignee: GM Global Technology Operations LLC, Detroit, MI (US)

( * ) Notice: Subject to any disclaimer, the term of this patent is extended or adjusted under 35 U.S.C. 154(b) by 594 days.

(21) Appl. No.: 12/376,093

(22) PCT Filed: Jun. 6, 2007

(86) PCT No.: PCT/EP2007/005985
§ 371 (c)(1),
(2), (4) Date: Nov. 24, 2009

(87) PCT Pub. No.: WO2008/014868
PCT Pub. Date: Feb. 7, 2008

(65) Prior Publication Data
US 2010/0149827 A1    Jun. 17, 2010

(30) Foreign Application Priority Data
Aug. 2, 2006 (DE) .......................... 10 2006 036 361

(51) Int. Cl.
*F21V 21/28* (2006.01)
(52) U.S. Cl. ........ 362/465; 362/464; 362/466; 362/467; 362/468; 362/469
(58) Field of Classification Search ........... 362/459–549
See application file for complete search history.

(56) References Cited

U.S. PATENT DOCUMENTS

| 5,876,113 A | 3/1999 | Gotoh |
| 5,909,949 A * | 6/1999 | Gotoh .......................... 362/465 |
| 2002/0039296 A1 | 4/2002 | Nishimura et al. |

FOREIGN PATENT DOCUMENTS

| DE | 19722457 A1 | 12/1997 |
| DE | 19723045 A1 | 12/1997 |
| DE | 19905114 A1 | 8/2000 |
| DE | 10314872 B3 | 11/2004 |
| DE | 10345304 A1 | 4/2005 |
| DE | 102004060880 A1 | 7/2006 |
| EP | 1354761 A2 | 10/2003 |
| JP | 5305845 A | 11/1993 |
| JP | 2002178828 A | 6/2002 |

OTHER PUBLICATIONS

International Searching Authority, PCT International Search Report for PCT Application No. PCT/EP2007/005985, Sep. 27, 2007.

* cited by examiner

*Primary Examiner* — William Carter
(74) *Attorney, Agent, or Firm* — Ingrassia Fisher & Lorenz, P.C.

(57) ABSTRACT

A headlamp in an automobile, which is rotatable about a yaw axis when negotiating a bend, has a controller for controlling the rotary movement. In order to improve the illumination of a roadway lying in front of an automobile, the controller may take into account unstable driving situations.

8 Claims, 1 Drawing Sheet

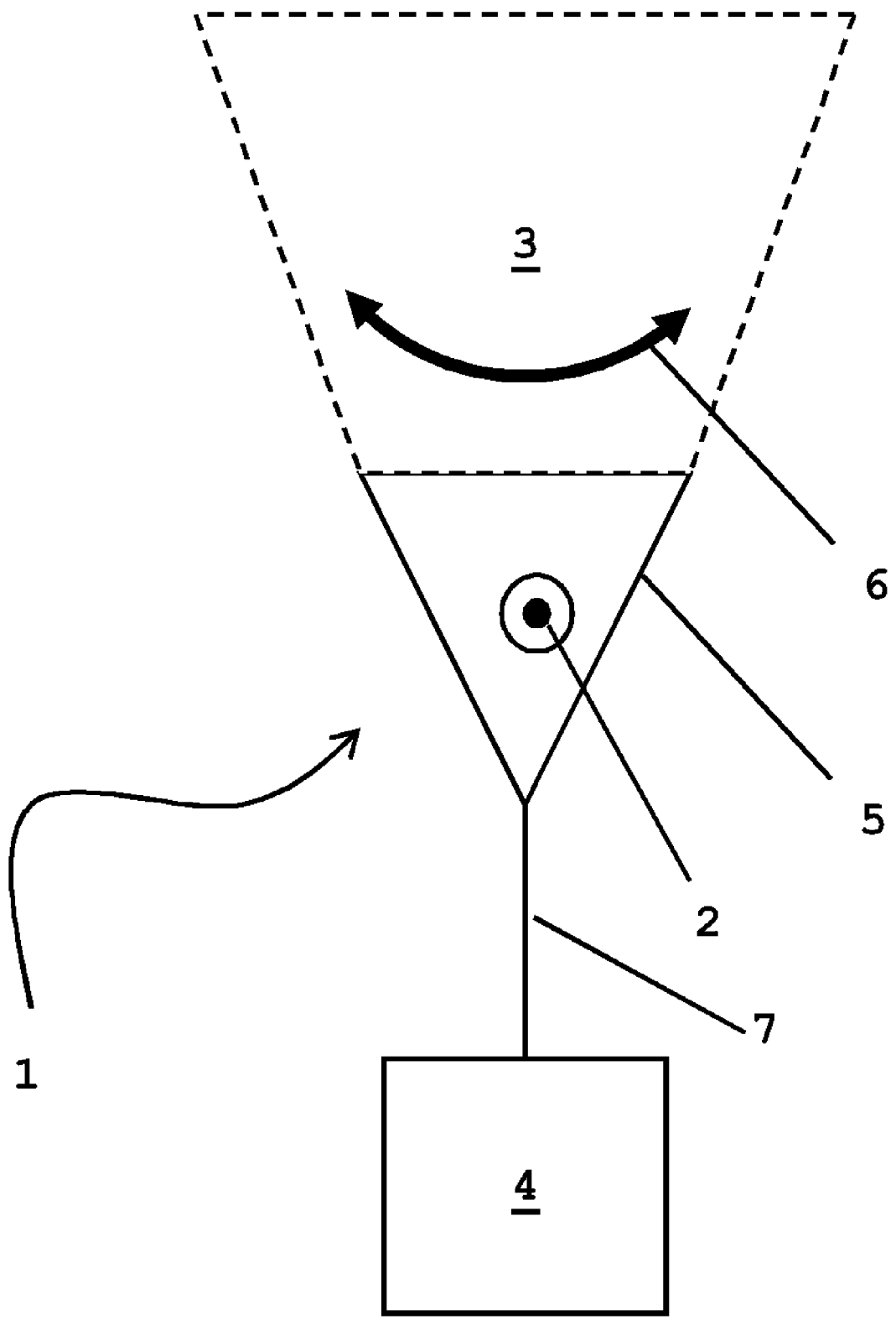

HEADLAMP IN AN AUTOMOBILE

CROSS-REFERENCE TO RELATED APPLICATIONS

This application is a U.S. National-Stage entry under 35 U.S.C.§371 based on International Application No. PCT/EP2007/005985, filed Jun. 6, 2007, which was published under PCT Article 21(2), and claims priority to German Application No. 102006036361.2, filed Aug. 2, 2006, which are all hereby incorporated in their entirety by reference.

TECHNICAL FIELD

The invention relates to a headlamp in an automobile, which is rotatable about a yaw axis when cornering, comprising a controller for controlling the rotary movement.

BACKGROUND

Headlamps which illuminate the roadway section lying in front of the automobile and which adapt the illumination during driving, are being increasingly widely used, especially in new and high-quality automobiles. With these headlamps, the emitted light is not only emitted straight in front or in a fixed direction, but the headlamp, in particular its reflector, is designed in such a manner that during cornering, areas located obliquely in front of the automobile can also be illuminated to avoid colliding with a non-illuminated obstacle in the bend. To this end, a light cone emanating from the headlamp is pivotable or rotatable about a substantially vertically aligned yaw axis. It is hereinafter implied that either the entire headlamp or only a part thereof, such as the reflector for example, or only a lamp inside the reflector, is turned to obtain different directions of emission.

For turning the headlamp, a controller is provided which can be integrated in a central controller of the automobile, wherein, inter alia, signals relating to the vehicle speed and/or a steering-lock angle, which determines the radius of the bend being negotiated, can be fed to the controller. These signals can be used by the controller to calculate the optimum pivot angle of the headlamp for the best possible illumination and an electrical adjusting motor, for example, can be correspondingly driven.

Known from EP 1 354 761 A2 is a device for controlling a cornering light headlamp, which has an additional yaw rate sensor and a transverse acceleration sensor in order to drive turning of the headlamp by means of these sensor signals. Thus, however, additional sensors are required in the automobile or on the headlamp.

The known headlamps are disadvantageous insofar as when the headlamp is driven by means of the steering-lock angle as well as the vehicle speed, in particular during short and rapid steering movements which result in virtually no change in the direction of travel, the headlamps are turned nevertheless, with the result that when negotiating a bend, areas of the roadway are inadequately illuminated. In addition, during understeering of the automobile, the effect may arise that the headlamps illuminate too far into the inside of the bend and the outer edge of the roadway is not sufficiently illuminated. If the vehicle is oversteering, the opposite effect occurs.

It is at least one object of the invention to provide a headlamp of the type specified initially, where uniform illumination of the roadway is ensured even when negotiating a bend at speed. In addition, other objects, desirable features, and characteristics will become apparent from the subsequent summary and detailed description, and the appended claims, taken in conjunction with the accompanying drawings and this background.

SUMMARY

According to the invention, this object is achieved whereby the controller can take into account an unstable driving situation.

With a headlamp controller designed in such a manner, the headlamp light cone being pivotable substantially about a vertical yaw axis, during unstable or critical driving states of the automobile, for example, during understeering or oversteering, the roadway lying in front can nevertheless be correctly illuminated since the relevant signals relating to the driving state of the automobile are fed to the controller, for example, by means of electronic steering aids such as ESP or the like, which are preferably already present in the automobile. If an ESP controller ascertains that the automobile is understeering, i.e., that the headlamps would illuminate too far into the inside of the bend, this can be counteracted by the controller and, for example, the instantaneous position or the pivot angle of the headlamp can be retained. At the same time, unstable driving situations can be determined, inter alia, from speed or acceleration signals and/or by means of feedback via spinning wheels.

Within the scope of the invention, the term "unstable driving situation" is to be understood as any driving state of an automobile in which a deviation occurs between steering lock and actual direction of travel of the automobile. This is particularly the case during an understeer or oversteer. Naturally, if there are two or more headlamps at the front of the automobile, only one controller is provided for all the headlamps.

The advantage of the invention is that a controller already provided for driving the rotary movement of the headlamp can be designed in a simple manner in terms of hardware and/or software in order to ascertain unstable driving situations of the automobile or to take into account the actual pivoting of the headlamps or the light cone emanating there from.

In an advantageous embodiment, in an unstable driving situation, the instantaneous position or the instantaneous pivot angle of the headlamp or the light cone emanating there from should be retained. Thus, despite understeer or oversteer when negotiating a bend, at least a large proportion of the roadway lying in front is illuminated.

Expediently, after an unstable driving situation has been ascertained by the headlamp controller, this headlamp is again reset to a zero position, i.e., straight ahead in the longitudinal direction of the automobile. With this neutral position, the largest possible range of all possible driving situations of the automobile is covered in order to ensure adequate illumination of the roadway lying in front. Naturally, for example, the left headlamp can be aligned slightly toward the right edge of the roadway to avoid glare to oncoming traffic.

In order to achieve continuously satisfactory illumination of the roadway by the headlamps, according to a further development, a turning rate may be taken into account when the automobile is negotiating a bend. In particular, the signal of a turning rate sensor known per se may be used for this purpose. On the basis of the actual turning rate, the controller can determine the bend radius actually negotiated in order to accordingly align the headlamps for optimum illumination of the bending roadway.

In order to increase road safety, in an extreme driving situation of the automobile, the controller pivots the headlamps back into their neutral position to allow illumination of the roadway lying in the longitudinal direction in front of the automobile. In this context, extreme driving situation is to be understood in particular as uncontrolled skidding of the automobile.

Hereinbefore, the headlamp has been described substantially in relation to an automobile. It is apparent, however, that such a headlamp may also be used in other areas of technology, for example, in an aircraft.

It is understood that the features described previously and still to be described subsequently may be used not only in the respectively specified combination but also in any combination. The scope of the invention is only defined by the claims.

BRIEF DESCRIPTION OF THE DRAWINGS

The present invention will hereinafter be described in conjunction with the following drawing figures, wherein like numerals denote like elements, and The single drawing shows the schematic structure of a headlamp according to an embodiment of the invention in an automobile.

DETAILED DESCRIPTION

The following detailed description is merely exemplary in nature and is not intended to limit application and uses of the invention. Furthermore, there is no intention to be bound by any theory presented in the preceding background and summary or the following detailed description.

The headlamp 1 is pivotable about a yaw axis 2, as depicted by the double arrow 6, in order to align a light cone 3 in different directions. In this case, either the entire headlamp 1 or only a reflector 5 or a lamp or a shade may be moved relative to the reflector 5. An electric adjusting motor, which is driven by a controller 4, is used for pivoting the headlamp 1, this being indicated by the connecting line 7.

Signals relating to the instantaneous driving state of the automobile are transmitted to the controller 4, for example, via an ESP system, where the controller 4 can ascertain an unstable driving situation, in particular, understeer or oversteer, by means of the signals. If such an unstable driving situation is registered by the controller 4, this can be taken into account in the alignment of the headlamp 1 or the light cone 3. For example, in the event of understeer, which has the result that the headlamp illuminates too far into the inside of the bend, the pivot angle of the headlamp 1 can be slightly reduced in order to again sufficiently illuminate the roadway lying ahead of the automobile in the direction of travel.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment of the invention, it being understood that various changes may be made in the function and arrangement of elements described in an exemplary embodiment without departing from the scope as set forth in the appended claims and their legal equivalents.

The invention claimed is:

1. An automobile headlamp system, comprising:
a headlamp rotatable about a yaw axis; and
a controller adapted to control a rotary movement of the headlamp, wherein the controller ascertains that the automobile is in an unstable driving situation during which a deviation occurs between steering lock and actual direction of travel of the automobile, and, in response to ascertaining that the automobile is in the unstable driving situation, the controller controls the rotary movement of the headlamp to reset the headlamp to a zero angle position during the unstable driving situation, wherein the zero angle position is straight ahead in a longitudinal direction of the automobile.

2. The automobile headlamp system according to claim 1, further comprising an electronic steering aid adapted to provide data for evaluation by the controller.

3. The automobile headlamp system according to claim 1, wherein the controller is adapted to evaluate a speed to control the rotary movement of the headlamp.

4. The automobile headlamp system according to claim 1, wherein an instantaneous position of the headlamp is retained in the unstable driving situation.

5. The automobile headlamp system of claim 1, wherein the controller is adapted to account for an automobile turning rate.

6. The automobile headlamp system according to claim 1, wherein the controller is adapted to position the headlamp in the zero angle position upon identification of an extreme driving situation.

7. The automobile headlamp system according to claim 1, wherein the controller is adapted to evaluate an acceleration signal to control the rotary movement of the headlamp.

8. The automobile headlamp system according to claim 1, wherein the controller is adapted to evaluate a signal from a wheel sensor to control the rotary movement of the headlamp.

* * * * *